United States Patent

[11] 3,602,736

[72] Inventors Terry R. Walther
Sunnyvale;
Michael R. McCoy, San Jose, both of, Calif.

[21] Appl. No. 7,769
[22] Filed Feb. 2, 1970
[45] Patented Aug. 31, 1971
[73] Assignee Electronics Arrays, Inc.
Mountain View, Calif.

[54] MOS RATIOLESS REGISTER STAGE
5 Claims, 3 Drawing Figs.

[52] U.S. Cl. .......... 307/221, 307/205, 307/214, 307/279
[51] Int. Cl. .......... G11c 19/00
[50] Field of Search .......... 307/205, 214, 221, 279

[56] References Cited
UNITED STATES PATENTS

| | | | |
|---|---|---|---|
| 3,322,974 | 5/1967 | Ahrons et al. | 307/221 X |
| 3,395,292 | 7/1918 | Bogert | 307/221 |
| 3,497,715 | 2/1970 | Yen | 307/205 |

*Primary Examiner*—John S. Heyman
*Attorney*—Smyth, Roston & Pavitt

ABSTRACT: An inverter for a two-inverter-register stage is disclosed using MOS field effect transistors of minimum size. The inverter has two regular transistors and a three main electrode field effect device, two electrodes thereof are respectively connected in series with the two transistors, and the entire arrangement is serially connected between one clock line of a two phase clocking system and ground. The gate of the three main electrode device is connected directly to the other clock line and capacitively to the three electrode device for feedback. The grounded regular transistor receives data signals, the third electrode of the three electrode device serves as inverter output and as input for the output-inverter of the same register stage or an input for the input inverter of the next stage for a shift register or of the same stage for a flip-flop.

INVENTORS:
Terry R. Walther
Michael R. McCoy
By Smyth, Roston & Pavitt
ATTORNEYS

MOS RATIOLESS REGISTER STAGE

The present invention relates to improvements in the art of field effect transistors and relates particularly to integrated circuit type structure operation with conduction control through channels by means of insulate gates, using the arrangement of metal-oxide-semiconductor which is conventionally called an MOS device. The invention relates more particularly to the providing of field effect transistor circuitry establishing register stages of favorable geometry on an integrated circuit chip.

Conventional shift register stages constructed of MOS field effect transistors usually operate with two field effect transistors connected serially between a source of voltage supply and ground. The gates of one of these transistors receives a control voltage whereas the other one receives a clock or phase pulse. Dependent upon the control voltage, the two transistors as connected between the voltage supply source and ground, can be conductive concurrently. Therefore, this series connection requires a load impedance.

An output voltage is taken from a junction intermediate the series connection and transferred to a storage node. That voltage, however, will have sufficient magnitude, different from ground, only if the impedances of the two series connected transistors, in the conductive state, differ significantly from each other. Differences in impedance, particularly in the conductive state of a field effect device included in an integrated circuit chip, are usually established by choice of geometry, i.e., the channel of a field effect device which is to have relatively high impedance in the conductive state as compared with other transistors in the conductive state, must be considerably longer.

If follows from the foregoing that this type of circuit requires some of the field effect devices to be comparatively large which, of course, it detrimental as to the packing density of components in an integrated circuit chip. It is, therefore, desirable to design a circuit in which the field effect transistors have minimum size. That is to say, the channel has to be just as long as is necessary to obtain a significant impedance difference therein when subject to control between conductive and nonconductive states, by gate control.

An attempt has been made previously to provide a circuit arrangement for a shift register stage which permits employment of minimum size field effect transistors, but this was found to require an increase in the number of transistors employed, and it was found also that some such systems require four different clock phases. This, of course, is detrimental to the operating speed of the device.

The problem, therefore, exists to provide register stages, in which minimum size transistors can be employed and which do not require more than two alternating clocks. Moreover, there should be a minimum of components in the sense that for each particular register stage the number of distinctive electrodes to be established as distinct zones within the semiconductor can likewise be kept at a minimum.

MOS shift register stages usually are comprised of two substages effectively connected in series, whereby this intersubstage connection establishes a storage node. Each substage provides inversion of an input, and each of them operates at different times. The first substage-inverter provides an inverted output for storage in the intersubstage coupling node; the second substage receives the charge content of that node as input and provides subsequently an inverted output in response thereto.

The two substages of the register stage in accordance with the invention are operated by the alternating clock pulses of two clock phases, but in complementary fashion. The inverter stage for a register stage, in accordance with the preferred embodiment of the present invention, includes as basic element a novel field effect device which is comprised of a single, gate-controlled, MOS type channel and three adjoining main electrodes. The three electrodes are conductively coupled together by and through the channel when the single gate electrode of that device renders the channel conductive. The three main electrodes are decoupled, except for high leakage impedance, when the gate renders the channel nonconductive.

The first one of these three electrodes is operated as a source electrode in that it connects to the drain electrode of a regular, two electrode field effect transistor having its source electrode connected to ground and its gate connected to receive the data input. A second electrode of the three electrode device is operated as drain electrode in that it connects to the source electrode of the second, regular, two electrode field effect transistor, the latter having its gate and drain electrodes interconnected and coupled directly to a first clock pulse line. The third electrode of the three electrode device is not connected to any transistor of that particular inverter stage; instead, it serves as output electrode, and is connected to the data gate of the next inverter stage for establishing therewith a storage node. This node is an interinverter stage coupling node.

The drain electrode of the three electrode device is capacitively interconnected with the gate of the three electrode device and provides another, but intrainverter stage storage node charging of which is under control of the clock operated transistor as connected to the drain electrode of the three electrode device. The gate electrode of the three electrode device and the capacitor are connected additionally to receive a second clock phase signal, interspaced with the first clock phases but of similar polarity.

The last mentioned, intrainverter stage node is charged by and during first clock phases by operation of the clock operated transistor. During second clock pulse phases as applied to the gate of the three electrode device, the capacitor provides additional charge to the intrainverter stage node. Subsequently the charge content of the intrainverter stage node is either transferred to the inter stage node as connected to the third or wing electrode of the three electrode device or discharged to ground, depending upon the state of conduction of the data signal operated transistor.

Two of such inverters are connected in series, but the gates of the respective three electrode devices, and the clock operated transistors are operated complementary by the same two phase clock signals. Together they provide a doubly inverting register stage, storing a data bit for a period equal to the clock pulse rate period of either clock pulse train.

As will be developed fully below, at no time does there exist a conductive current path between either of the two clock pulse lines and ground. The charge state of the interstage storage node, established by the output electrode of the first one of two inverters and by the data input of the succeeding one of the two inverters of the register stage, does not depend upon any impedance ratio of transistors in the conductive stage. The two regular field effect transistors and the three-electrode-field-effect device are all of minimum size as defined.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which;

Figure 1:
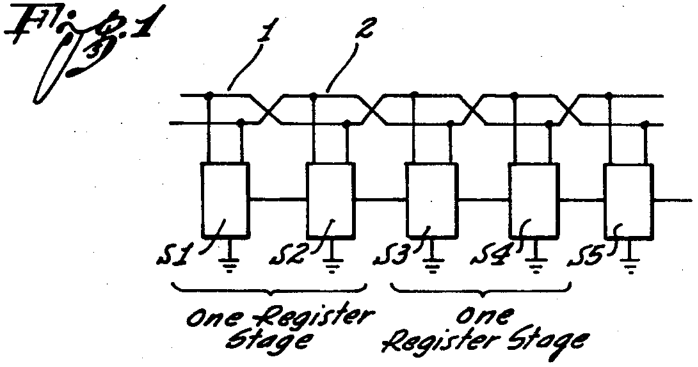
FIG. 1 illustrates a block diagram of a shift register as improved in accordance with the invention.

Proceeding now to the detailed description of the drawings, FIG. 1 thereof illustrates a plurality of inverters S1, S2, S3, S4, S5 serving as substages for shift register stages. Inverters S1 and S2 are serially connected and establish a register stage; inverters S3 and S4 establish the next register stage, etc. Each inverter has three additional connections. One connection leads to ground, and there are two phase or clock lines 1 and 2, which receive respectively shape signals Φ1 and Φ2. The connection of sequential substages-inverters for the lines 1 and 2 is reversed. Data are shifted into the input substage (such as S1, S3, S5, etc.) of each register stage at phase times Φ1 to be inverted and stored in intraregister stage storage nodes (intersubstage storage nodes). At the next phase time Φ2 the output substage (such as S2, S4, etc.) of each register stage inverts again and provides an output to the input substage of the next stage, forming an interstage storage node therewith.

Figure 2:
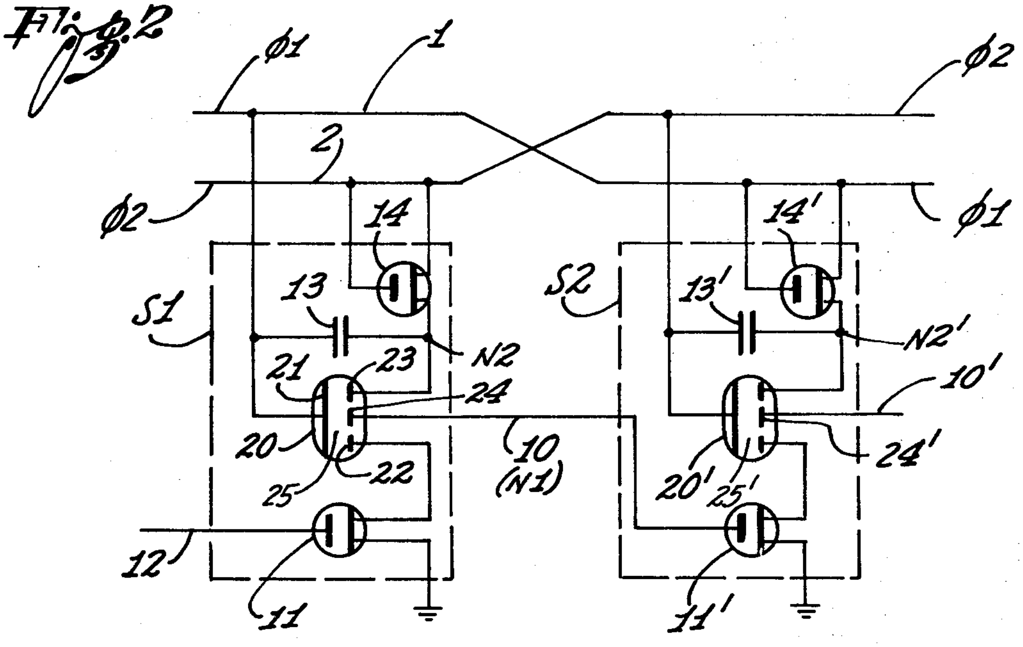
FIG. 2 illustrates a circuit diagram of a register stage as example for the preferred embodiment of the present invention.

Proceeding now to the detailed description of FIG. 2 there is illustrated a shift register stage which is composed of two substages S1 and S2. These two substages are identical in design, and they differ only in their respective connection to two clock lines 1 and 2, respectively, receiving clocking signals Φ1 and Φ2. The two clock pulse trains each have similar frequencies, but there is a phase shift between the pulses of the two rains so that in fact pulses Φ1 and Φ2 alternate as to their appearance. Turning now to the description of a substage, such as substage S1, this stage is basically comprised of three field effect devices. These field effect devices are presumed to be of the insulated gate type with a metal-oxide-semiconductor arrangement in or near the surface of a semiconductor, integrated circuit type chip.

There is a first transistor 11 having permanently grounded source electrode and a gate electrode connected to a line 12 which receives the data input signal for substage S1 which in this particular case is also the input for the shift register stage as a whole. The input line 12 connected to the gate of transistor 11 may connect to the output line of a preceding shift register stage or to the input circuit for the register as a whole.

The drain electrode of transistor 11 connects to a first main electrode of a particular, three main electrode, field effect device 20. This field effect device 20 has a channel symbolically denoted with reference numeral 25. This channel is established as is conventional for a field effect transistor, and is covered by a thin insulating layer on top of which extends a gate electrode 21. That channel 25 is now in internal contact with three particularly doped regions, individually similar to source and drain electrodes of conventional field effect transistors of the MOS type. If the substrate, i.e., the semiconductor body as a whole is of the N-conductor type, these three are heavily doped to establish P-zones.

In this particular case there may be a first region doped for P-type conduction and establishing a source electrode 22 for this particular employment of device 20. This source electrode is provided at one end of channel 25. A second main electrode, establishing a drain electrode 23 in this particular circuit may be connected physically, i.e., conductively, to the other end of channel 25. Adjacent the conductive path through channel 25 from electrode 22 to electrode 23 and in conductive contact with channel 25, there is a third electrode 24 which, in this particular case, serves as drain or as source electrode.

It is an essential feature of this device 20 that as long as a potential is applied to the gate electrode 21 having value in relation to ground and to the grounded substrate of the MOS device, so as to cause no significant conduction through channel 25, the three electrodes 22, 23 and 24 are free to change potential, essentially independently from each other, except for extremely low leakage current through the "nonconductive" channel 25.

In the present case, the source electrode 22 is connected to the drain electrode of transistor 11 as stated. A feedback capacitor 13 is connected between the gate electrode 21 and the particular drain electrode 23 of device 20. The capacitor 13 is essentially established by extending the doped region defining electrode 23, away from channel 25 of device 20. Likewise, the metallic electrode layer establishing the gate electrode 21 is extended to be disposed above that extended region of drain electrode 23. This extended portion of the drain electrode region as well as the extended portion of the gate electrode 21 are separated by a thin portion of the oxide or insulating layer, a thin portion of which extends between gate and channel. This structure of extended electrodes establishes capacitor 13.

The gate electrode 21 and the one electrode of capacitor 13 connected thereto or integral therewith connect, for example, to the clock line 1 to receive phase signal Φ1. The drain electrode 23, as well as the other side of capacitor 13, connect to the source electrode of another transistor 14 having gate and drain electrodes connected to line 2 to receive signal Φ2. It can thus be seen, that the output electrode 24 of the system which is the third electrode of device 20, is not connected directly to clock operated transistor 14 or to data operated transistor 11, except when channel 25 is rendered conductive during clock phase Φ1.

After having described the basic structure of a substage S1, it is now emphasized and pointed out that each of the devices 11, 20 and 14 have minimum sizes. That is to say, their physical dimensions are chosen to be as small as possible and feasible to obtain satisfactory field effect performance. Under these constraints each of these devices provide minimum impedance when in the conductive state. Most particular, it is not necessary that any particular impedance ratio in the conductive state exists as between the channel impedances of the devices 11, 20 and 14.

The substage S2 is, as stated above, comprised of similar parts and corresponding components and elements have similar reference numerals with a "prime" added to each of them for providing distinction. Connection line 10 connects electrode 24 of device 20 to the gate electrode of transistor 11′ and establishes a node N 1. This node can at times be completely isolated from the remaining circuitry, particularly from any of the pulse lines 1 and 2 as well as from ground. Therefore, node N1 is capable of storing a particular charge and of holding that charge for a certain period of time.

Node N1 is the intersubstage, interinverter, or intrastage storage node of this particular shift register stage. Each substage or inverter has, in addition, an internal storage node, which is node N2 of substage S1 and is established essentially by capacitor 13 and particularly by that portion of the substage circuit which constitutes the source electrode of transistor 14, the one electrode of capacitor 13 and the drain electrode 23. That particular portion of the circuit can likewise be completely isolated from clock lines 1 and 2 as well as from ground. There is a corresponding intrasubstage node N2′ in substage S2.

The stage S1 operates as follows. During clock or phase time Φ2, the circuit is prepared in that the transistor 14 is rendered conductive and charges node N2, for example, negatively, to a voltage level approximating the negative level of the clock signal Φ2. The line 1 is held at ground potential at that time, so that the capacitor 13 can effect charge, and a negative charge is established and can be maintained in node N2. Moreover, device 20 is nonconductive at that time so that the potential of node N2 is independent from the charge state of node N1 and from the potential of electrodes 24 and 22.

During the next pulse Φ1, negative potential is applied to gate electrode 21 of device 20. Capacitor 13 having one electrode connected to the negative going signal Φ1 causes additional negative charge to be established on Node N2, by double charging of node N2. In this manner, node N2 achieves a very high negative charge. This high negative charge is essential for optimum operation as it will be seen that under one condition of operation the charge of node N2 must be shared with that of node N1 with the resulting potential being high enough to cause conduction of the following stage input.

The voltage potential of electrode 24 and, therefore, the charge state to be established in node N1 now depends whether or not electrode 22 exercises dominant bias control over device 20 or not. Assuming that at a time a signal Φ1 renders device 20 conductive, a negative at a voltage appears in line 12 then the gate of transistor 11 has rendered the transistor 11 conductive. Therefore, electrode 22 is in effect grounded through conductive transistor 11 by the time device 20 is rendered conductive, and node N2 is rapidly discharged, through conductive devices 20 and 21. It is important to note that there is no galvanic conductive connection between the line 1 and ground. The line 1 is insulated from ground, in spite of the state of conduction of devices 11 and 20, because line 1 is connected to the substage S1 only to one side of capacitor 13 and to the gate electrode 21 and both of these electrodes are insulated from conductive channel 20 through the oxide layer of the MOS structure. Thus line 1 is not connected to any principal electrode which is in galvanic conductive connection with a conceivably conductive channel.

As devices 20 and 11 are rendered conductive concurrently, there may be a charge in node N1, but that charge is immediately likewise discharged to ground, because electrode 24 is forced to assume ground potential due to its galvanic connection to channel 25. Thus, for a negative voltage in line 12 at a time Φ1, nodes N1 and N2 discharge and assume substrate or ground potential. As soon as ground potential is established in nodes N1 and N2, current flow through devices 11 and 20 more or less ceases.

It may now be assumed that as signal Φ1 is taken negative, line 12 is at ground potential so that transistor 11 is nonconductive. Electrode 22 is at that time isolated from the remainder of the circuit, and is particularly isolated from ground. Now, as device 20 is rendered conductive, node N2 is coupled to node N1. If at that time node N1 holds a negative charge, that charge is replenished. If node N1 has ground potential, the charge in node N2 is shaped with node N1.

It can readily be seen from the foregoing that substage S1 (and of course substage S2) operates as inverter. For a negative signal in line 12 representing, for example a digital "1," ground potential is provided to output line 10 and to node N1; for a ground potential signal in line 12, equivalent to a digital "0" a negative signal is established in output line 10 and node N1. The stage S2 operates analogously but with a phase shift equal to the phase shift between signals Φ1 and Φ2, because the phases of operation of stages S1 and S2 are reversed resulting in a phase shifted signal transfer from substage to substage.

Output line 10' receives a negative signal (or ground) if previously a negative (or ground) signal was applied to line 12, but for a full clock pulse period later. A new output of output substage S2 is established in line 10' at clock pulse phase time Φ2, and if input line 10 of input substage S1 connects to the output substage of a preceding register stage, a new input for substage S1 is likewise established upon Φ2. The respective signals remain represented as charge states in the respective interstage coupling modes until the next pulse Φ2 appears, while during clock pulse time Φ1, the logical content of line 12 is inverted and stored in the respective intrastage node N1.

It can readily be seen that the circuit has a significant advantage over a conventional circuit as the particular potential for the intrastage node N1 is not established as a relative voltage drop between two conductive transistors connected between a clock line or voltage source and ground. Instead, the preceding phase signal, Φ2 in the case of substage S1, is used to provide and store a particular charge in an intrasubstage storage node N2 while node N1 remains isolated. That charge in node N2 is transferred to node N1 during the next pulse Φ1, or nodes N1 and N2 are discharged to ground.

It is also important, that there is no need for an additional isolation transistor between a substage and the principal intrastage—intersubstage storage node N1. Device 20 is conductive during each phase Φ1, but only during phase Φ1. Thus, as the node N2 is preparatorily charged during Φ2 and as concurrently a new data signal is applied to the gate of data transistor 11, possibly rendering the same conductive, node N1 remains completely isolated from the remainder of the substage S1 because device 20 is nonconductive at that time.

Furthermore, one can see that each substage consumes very little power as there is never any conductive path between ground and any clock line, except through high impedance leakage paths.

It can be seen that minimum geometry can be established within an integrated circuit chip even when using conventional techniques and patterns as far as establishing individual connections is concerned. As one can see, each substage has three separate channels, one for each of the MOS transistor devices. The drain electrode of transistor 11 as well as the source electrode 22 of device 20 can be one and the same regions doped for complementary type conduction as compared with the substrate and simply bounding and adjoining two different channels, one pertaining to transistor 11, the other one being channel 25. Likewise, the particular doped region establishing node N2 and including the source electrode of transistor 14, the drain electrode 23 as well as one electrode of capacitor 13 is a second conductive and heavily doped region. A third, electrode-establishing, doped region adjoins the channel of transistor 14 and connects to phase line Φ2. A fourth doped region is disposed adjacent channel 25 to establish electrode 24. Three electrode plates lead respectively to the gates of transistors 11, 14 and 20. Finally the source electrode of transistor 11, established by a fifth doped region can be externally or internally connected to the grounded substrate of the chip.

Figure 3:
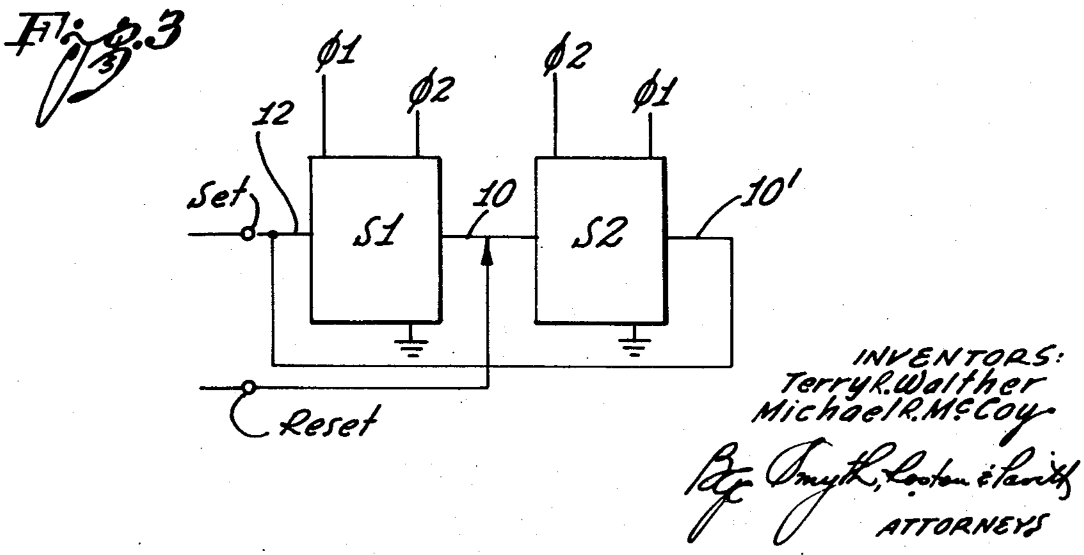
FIG. 3 illustrated a block diagram, a modification of the circuit shown in FIG. 2 to establish a dynamically operated bistable device.

FIG. 3 illustrates a modification of the circuit connection of FIG. 2 to establish a flip-flop. Line 10' is connected to line 12 to establish an additional node N3. Node N3 will always have a charge state opposite to the charge state of node N1. By operation of the circuit as described node N3 receives a negative potential by charge transfer from node N2' whenever node N1 is discharged. Thus, the input for the gate of transistor 11 is replenished by this operation. It can readily be seen that by coupling line 10' to line 12 so as to establish this additional node N3, the charge state thereof and the charge state of node N1 are periodically replenished so that in fact the device can remain stable but on a dynamic basis. These charge states are, of course, complementary, so that, for example, for the set state, node N1 is charged and node N3 is discharged. During each phase Φ1, the charge of N1 is replenished, during each phase Φ2 the node N3 is coupled to ground. For resetting the flip-flop, node N1 is discharged through external circuit means coupled likewise to node N1 but not participating in the dynamically stable state. Forced external discharge of a node operates as input to be inverted and causes the other node to charge, so that the flip-flop changes state.

The invention is not limited to the embodiments described above but all changes and modifications thereof not constituting departures from the spirit and scope of the invention are intended to be covered by the following claims.

1. In an integrated circuit of the MOS type, there being a first and a second clock pulse line alternatingly receiving clock pulses, there being means to provide ground potential where needed in the circuit, the combination comprising:

first means defining a first, gate-controlled-field-effect channel conductively adjoining three separate electrodes, there being a first, a second and a third electrode;

a first field effect transistor having drain, source and gate electrodes, the source electrode being grounded, the drain electrode connected to the first electrode of the first means, the gate electrode connected to receive data signals;

a second field effect transistor having drain, source and gate electrodes, the source electrode connected to the second electrode of the first means, the gate electrode connected to the first pulse line, the drain electrode connected to receive biasing voltage, at least during gating-on as provided by the gate electrode of the second field effect transistor;

a capacitor connected directly between the second electrode and the second clock pulse line, the gate of the first means likewise connected directly to the second pulse line; and means for isolating the third electrode from the first and second field effect transistors except for conduction through the channel of the first means.

2. In an integrated circuit as in claim 1, there being second means, similar to the first means and disposed in the vicinity thereof, there being third and fourth transistors respectively connected to ground and to the electrodes of the second means as the first and second transistors are connected to the first means, the gate electrode of the third transistor directly connected to the third electrode of the first means to form a node therewith by operation of the isolation means, the gate electrode of the fourth transistor connected to the second pulse line, the drain electrode of the fourth transistor connected to receive biasing potential at least during gating-on as provided by the gate electrode of the fourth means; and a capacitor connected between the first pulse line and the interconnected source electrode of the fourth transistor and of the second electrode of the second means.

3. In a circuit as in claim 2, the third electrode of the second means connected to the gate electrode of the first field effect transistor.

4. In a shift register of the MOS-field effect type, a plurality of similar substages each having an input and an output, the output of a substage connected to the input of another substage to form a series circuit of substages, with a node established by each input-output interconnection;

first and second clock lines receiving alternatingly clock pulses;

an insulated gate field effect channel with three adjoining main electrodes in each substage, controlled by a gate, the gates of sequential substages connected to alternate first and second clock lines;

first insulated gate, field effect transistor means in each substage, the gate thereof constituting the input of the substage, the first field effect transistor means connected between one of the main electrodes and ground; and a second insulated gate, field effect transistor means in each substage, the gate thereof connected to alternate second and first clock lines;

the second means connected between a source of biasing voltage and a second one of the main electrodes, the third main electrode isolated from the first and second means except for conduction in the channel and constituting the output of the substage.

5. In a register as in claim 4, each substage including a capacitor connected to the second main electrode and the gate thereof coupled to the channel with the three adjoining, main electrodes.